US008002065B2

(12) United States Patent
Glavinic et al.

(10) Patent No.: US 8,002,065 B2
(45) Date of Patent: Aug. 23, 2011

(54) TRACTOR-TRAILER AXLE CENTER HEIGHT CONTROL METHOD AND APPARATUS

(75) Inventors: Andelko Glavinic, Hannover (DE); Michael Schoppe, Hannover (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 119 days.

(21) Appl. No.: 12/454,971

(22) Filed: May 26, 2009

(65) Prior Publication Data
US 2009/0322048 A1 Dec. 31, 2009

(30) Foreign Application Priority Data

Jun. 27, 2008 (DE) .................. 10 2008 030 598
Oct. 30, 2008 (DE) .................. 10 2008 054 044

(51) Int. Cl.
*B60G 17/016* (2006.01)
*B60G 17/018* (2006.01)
*B62D 61/12* (2006.01)

(52) U.S. Cl. ........ 180/209; 180/22; 280/86.5; 280/5.52; 701/37; 701/82

(58) Field of Classification Search .............. 180/22, 180/209, 41; 280/86.5, 5.514, 5.52, 6.15, 280/6.159, 6.157; 701/37, 39, 65, 71, 82, 701/92, 213, 300
See application file for complete search history.

(56) References Cited

U.S. PATENT DOCUMENTS

| 4,635,742 | A | * | 1/1987 | Bertolini ................ 180/209 |
| 5,035,439 | A | * | 7/1991 | Petrillo ................ 280/81.6 |
| 6,240,339 | B1 | * | 5/2001 | von Mayenburg et al. ...... 701/1 |
| 6,434,460 | B1 | * | 8/2002 | Uchino et al. ............ 701/37 |
| 6,997,464 | B2 | * | 2/2006 | Yakimishyn ............ 280/6.159 |
| 7,168,709 | B2 | * | 1/2007 | Niwa et al. ............ 280/5.518 |
| 7,401,870 | B2 | * | 7/2008 | Tseng et al. ............ 303/146 |
| 7,735,516 | B2 | * | 6/2010 | Morris ................ 137/596.15 |
| 2003/0155164 | A1 | * | 8/2003 | Mantini et al. ............ 180/209 |
| 2006/0006990 | A1 | * | 1/2006 | Obradovich ............ 340/439 |
| 2007/0265749 | A1 | * | 11/2007 | Fitzgibbons ............ 701/37 |
| 2009/0184480 | A1 | * | 7/2009 | Larsson et al. ............ 280/5.503 |

* cited by examiner

*Primary Examiner* — Paul N. Dickson
*Assistant Examiner* — George D. Spisich
(74) *Attorney, Agent, or Firm* — Kramer Levin Naftalis & Frankel LLP

(57) ABSTRACT

A tractor-trailer combination includes a semitrailer tractor having a front axle and at least one drive axle having a predefined nominal axle load, a semitrailer having a first axle and at least one second axle, and an axle load adjusting device, which has an axle center height drive for the first axle enabling the axle load acting on the drive axle to be changed by adjusting a center height of the first axle, that can automatically switch into a starting assistance mode in which the second-axle axle load is increased to a starting-assistance axle load that is always below a predefined maximum axle load. An axle center height controller is adapted to automatically detect actuation of an off-road starting sensing device, and increase the second-axle axle load to an off-road starting axle load that is greater than the maximum axle load if the off-road starting sensing device is actuated.

17 Claims, 2 Drawing Sheets

TRACTOR-TRAILER AXLE CENTER HEIGHT CONTROL METHOD AND APPARATUS

FIELD OF THE INVENTION

The present invention relates generally to an axle center height controller for a tractor-trailer combination, a tractor-trailer combination equipped with an inventive axle center height controller, as well as a method for operating such a tractor-trailer combination.

BACKGROUND OF THE INVENTION

An axle center height controller, which is also sometimes referred to as an axle center height control device, is a component of an axle load adjusting apparatus for tractor-trailer combinations. The axle load adjusting apparatus serves to change the center height of at least one axle of a semitrailer of the tractor-trailer combination, in particular a lifting axle, or to change the load taken up, and can be placed in a starting assistance mode.

The starting assistance mode is used to increase the weight acting on the drive axle, specifically, the drive-axle axle load, so that traction is improved. This enables the tractor-trailer combination to start more easily.

In order to protect public infrastructure, it is, typically, legally required that the axle load acting on an axle of the tractor-trailer combination not exceed a prescribed maximum axle load. In the European Union, for example, this maximum axle load is 130% of the nominal axle load, which is, itself, defined by the registration approval of the tractor-trailer combination.

A disadvantage with conventional axle center height controllers is that the tractor-trailer combinations equipped therewith start only with difficulty, in particular under tough ambient conditions and when they are fully loaded.

SUMMARY OF THE INVENTION

The present invention overcomes disadvantages associated with conventional axle center height controllers and provides improved axle center height control, which facilitates the starting of tractor-trailer combinations, including under tough ambient conditions and full loading.

An axle center height controller according to embodiments of the present invention has application in a tractor-trailer combination that includes (a) a semitrailer tractor having a front axle and at least one drive axle that has a predefined nominal axle load, (b) a semitrailer including a first axle and at least one second axle, and (c) an axle load adjusting device that includes an axle center height drive for the first axle, so that the axle load acting on the drive axle can be changed by adjusting the center height of the first axle, and that can be placed in starting assistance mode in which the second-axle axle load is increased to a starting-assistance axle load that is less than a predefined maximum axle load.

In accordance with embodiments of the present invention, the axle center height controller is adapted to automatically sense actuation of an off-road starting sensing device of the tractor-trailer combination and, when the off-road starting sensing device is actuated, to increase the axle load acting on the second axle of the semitrailer to an off-road starting axle load that is greater than the predefined maximum axle load for the second axle.

One object/advantage of the axle center height controller according to embodiments of the present invention is that an increased axle load, as compared to the axle load that is possible in a conventional tractor-trailer combination equipped with a conventional axle center height controller, can be applied to the drive axle if the underlying (ground) surface necessitates it. Such an increase in the axle load beyond the maximum axle load that is legally permissible is generally necessary only if particularly unfavorable ground conditions are present. Such unfavorable ground conditions rarely occur on public roads, but are routinely present, for example, on construction sites or other private property. However, in such areas, it is typically permissible to increase the axle load acting on the drive axle above the legally prescribed maximum axle load. The axle center height controller according to embodiments of the present invention therefore permits facilitated starting of tractor-trailer combinations under difficult conditions without violating legal requirements.

Another object/advantage of the present invention is that it can be implemented at low cost. It can be sufficient to provide an off-road starting sensing device that is constructed, for example, from a simple switch or some other control element. Alternatively, or additionally, the off-road starting sensing device can be part of a central controller that is configured to sense a lack of traction, in particular spinning of the drive axle wheels. It is also possible to use a standard control element, for example, a multifunction control element that is already present, as an off-road starting sensing device. The axle center height controller need only be reprogrammed in order to permit improved starting.

Within the scope of the present description, the axle load adjusting device refers to any device that is adapted, constructed and/or arranged to permanently and selectively change the axle load acting on the one or more drive axles. The axle load adjusting device can be an open- and/or closed-loop controller.

Also, within the scope of the present description, reference to the axle center height controller being capable of switching into the starting assistance mode means that the axle center height controller can be switched into a program mode in which the axle load adjusting device actuates an axle center height drive of the tractor-trailer combination such that the axle load acting on a semitrailer axle is increased, as a result of which the axle load acting on the drive axle is increased. In this context, the axle load is above the nominal axle load but below the predefined maximum axle load, which is stored, for example, in a digital memory and corresponds to the legal requirements for the operation of the tractor-trailer combination in public traffic areas.

Although the values for the maximum axle load and the nominal axle load for the second-axle axle load, for example, may be legally prescribed, they become a technical closed-loop and/or open-loop control parameter for the axle load adjusting device as a result of being predefined in the axle load adjusting device.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
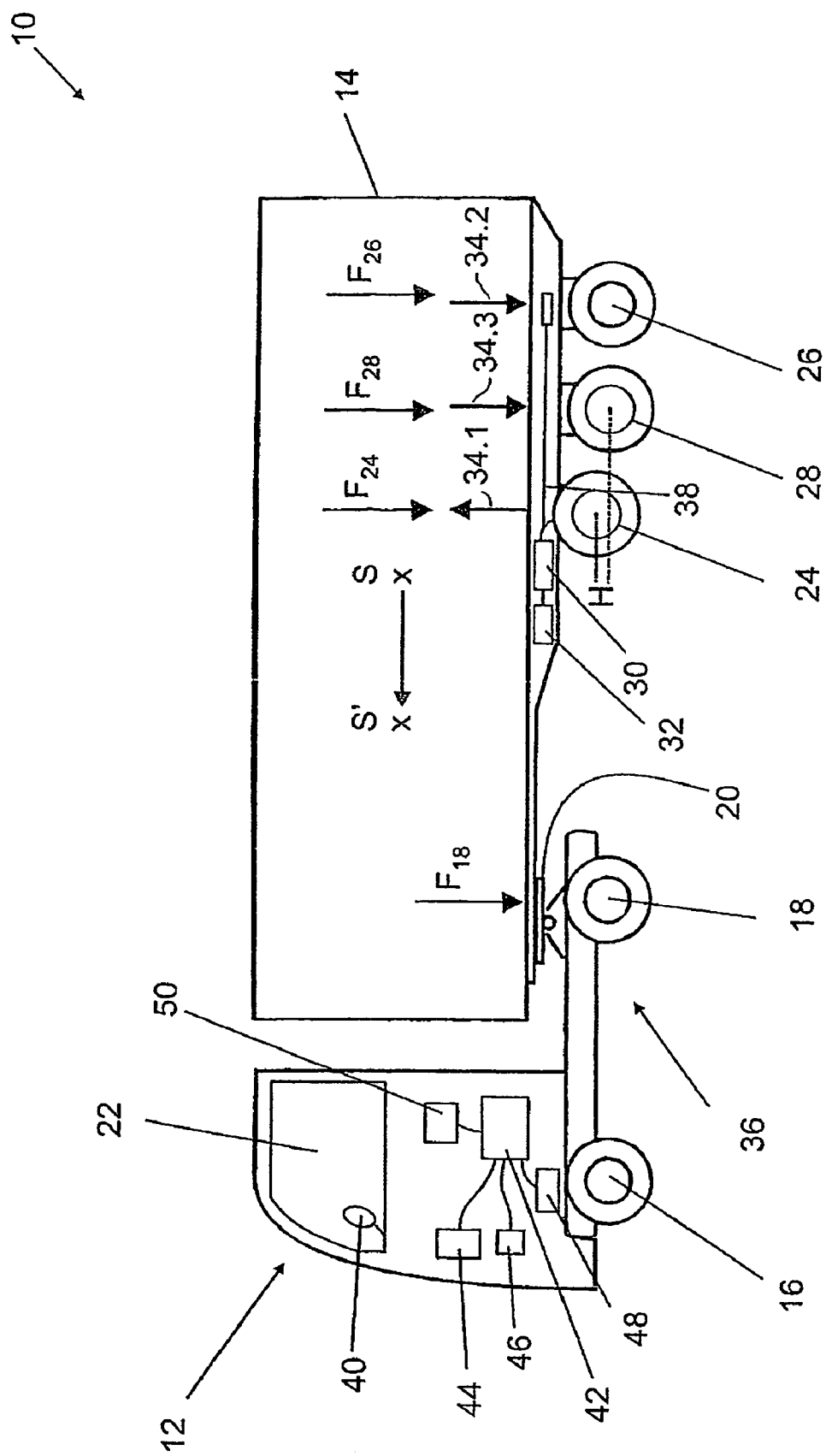
FIG. 1 is a schematic view of a tractor-trailer combination equipped with an axle height controller in accordance with an embodiment of the present invention.

The axle center height controller according to embodiments of the present invention has application in a tractor-trailer combination that includes (a) a semitrailer tractor having a front axle and one or more drive axles that have a predefined nominal axle load, (b) a semitrailer that has a first axle and at least one second axle, and (c) an axle load adjusting device that includes an axle center height drive for the first axle, so that a drive-axle axle load acting on the drive axle can be changed by adjusting a center height of the first axle, and that is configured to automatically switch into a starting assistance mode in which the second-axle axle load is increased to a starting-assistance axle load that is below a predefined maximum-axle load. The axle center height controller in accordance with embodiments of the present invention can automatically sense actuation of an off-road starting sensing device of the tractor-trailer combination and, when the off-road starting sensing device is actuated, increase the axle load acting on the second axle of the semitrailer to an off-road starting axle load that is greater than the predefined maximum axle load for the second axle.

The first axle of the semitrailer of the tractor-trailer combination is generally arranged between the semitrailer tractor and the second axle. The first axle is vertically adjustable by means of an assigned axle center height drive, and the axle load adjusting device, which includes the axle center height controller, is configured to adjust the axle load by actuating the axle center height drive.

For a given load acting on the semitrailer, the center of rotation of the semitrailer which faces away from the semitrailer tractor can be varied by changing the axle center heights or axle loads of the first axle relative to the second axle. In this way, the center of gravity of the semitrailer can be moved toward the semitrailer tractor or away from the semitrailer tractor. This increases the drive-axle axle load.

It is also possible for a third axle to be present between the first axle and the second axle. It is then possible for the first axle and the third axle to be adjustable by means of one axle center height drive each.

Also, the axle center height drive can be embodied such that it can lift the respective axle according to one operating mode and merely relieve the loading on it according to a second operating mode. For example two antagonistic pneumatic bellows can be provided for this purpose. Such load relief also leads to a small change in the axle center height owing to the resilience of the wheels of the axle, so that relieving the load on the axle constitutes an adjustment of the center height of the axle.

According to one embodiment of the present invention, the axle center height controller is adapted to sense the axle load acting on the second axle, and to adjust the drive-axle axle load on the basis of the second-axle axle load. If a third axle is present, it can also have an axle load sensor for measuring a third-axle axle load, and the axle load adjusting device can be adapted to adjust the drive-axle axle load on the basis of the second-axle axle load and, if appropriate, the third-axle axle load.

The axle load sensor, which is a component of a tractor-trailer combination according to an embodiment of the present invention, can be, for example, a sensor that measures the second-axle axle load and/or third-axle axle load directly, e.g., by means of a strain gauge. Alternatively, the axle load sensor measures the axle load indirectly, for example by measuring the air pressure in an air bellows of the respective drive axle.

The maximum axle load is preferably selected as 130% of the nominal axle load. This value corresponds to current legal requirements for the operation of a tractor-trailer combination in public traffic areas in the European Union.

The off-road starting axle load is preferably at most 200% of the nominal axle load. Typically, axles are configured such that such an off-road starting axle load can be applied without structural changes. The traction when starting on difficult off-road terrain can, therefore, advantageously be improved without requiring structural changes to the tractor-trailer combination.

In order to avoid permanent loading of the one or more second axles, and in order, therefore, to reduce undesirable aging, the axle center height controller preferably includes a time measuring device for measuring the elapsed time since the second-axle axle load exceeds the maximum axle load, to compare this elapsed time period with a predefined maximum time, and to reduce the second-axle axle load to below the maximum axle load if the maximum time is exceeded. There is a maximum time, which may be, for example, a minute, after which the tractor-trailer combination has either successfully started up or after which starting has failed. Providing the maximum time ensures that repeated attempts to start are not made so that the second axle is not excessively aged.

The time measuring device can be part of the axle center height controller or connected thereto. For example, a clock or the like that is present, for example, in an engine controller can be used for this purpose. Alternatively, or additionally, a separate clock can be provided.

According to an embodiment of the present invention, the axle center height controller is configured for sensing the velocity of the tractor-trailer combination, comparing the velocity with a predefined velocity threshold value, and reducing the second-axle axle load to below the maximum axle load (that is legally permissible for public traffic areas) if the velocity threshold value is exceeded. For example, the axle center height controller can be designed to be connected to a tachometer of the tractor-trailer combination. The higher the velocity of the tractor-trailer combination, the greater the forces acting on the axles due to unevennesses in the roadway. In addition, starting off at very low velocities or from a stationary state is problematic. As soon as the tractor-trailer combination has reached a certain velocity, a lower drive-axle axle load, which can be insufficient for the immediate starting off process, is sufficient for further acceleration.

The second-axle axle load, and therefore the drive-axle axle load, can be continuously reduced as the velocity increases. This means that the axle center height controller continuously senses, for example, the velocity and continuously adapts the axle load acting on the drive axle to the velocity. This makes it possible to provide a plurality of velocity threshold values, at the limits of which the second-axle axle load and, therefore, the drive-axle axle load are reduced.

The axle center height controller is preferably configured to sense the velocity, to compare the velocity with a predefined starting velocity threshold value, and to increase the second-axle axle load to an off-road starting axle load only if the starting velocity threshold value is undershot. That is, the axle load adjusting device is set such that it adjusts the second-axle axle load to at most the maximum axle load if the starting velocity threshold value is not reached. This prevents the second-axle axle load being increased to a value above the maximum axle load at a time when starting assistance is not required because the starting process is already finished.

In order to ensure that the relevant legal requirements regarding the maximum permissible axle loads are complied with, the axle center height controller is preferably designed to connect to a position sensing device, e.g., a satellite navigation device or a fixed triangulation radio network, and configured to sense the location of the tractor-trailer combination, to determine whether the tractor-trailer combination is located in a predefined region, and to increase the second-axle axle load to an off-road starting axle load only if the tractor-trailer combination is in the predefined region. The position sensing device can be an integral part of the axle center height controller.

In accordance with embodiments of the present invention, the tractor-trailer combination can have the position sensing device installed as part of the axle center height controller or, otherwise, connected thereto. For example, a GPS system (global positioning system) installed in the tractor-trailer combination can be utilized.

The predefined region is stored, for example, in digital memory of the axle center height controller and denotes a region in which the second-axle axle load can be increased to a value above the maximum axle load without running afoul of relevant legal regulations. For example, the predefined region can be a private construction site (private property) for which the prescriptions for the maximum permissible axle load do not apply. In order to avoid undesirable manipulation, the digital memory in which the predefined region is stored can be read-only memory. It is also possible to provide that, whenever the second-axle axle load is increased above the maximum axle load, an entry is generated in a data recorder.

The axle center height controller can be connected to a traction controller, with the axle load adjusting device being adapted to increase the second-axle axle load if the wheels of the drive axle slip. This ensures that the optimum axle load is always applied to the drive axle while satisfying relevant legal requirements.

According to an embodiment of the present invention, the axle center height controller includes a digital memory for storing the nominal axle load, the maximum axle load and/or the delimiting axle load. The nominal axle load and the maximum axle load are linked to a spatial region for which they apply. If a tractor-trailer combination is used in various parts of the world, the legal requirements in terms of the maximum legally permissible axle load and/or the nominal axle load may differ. Since these values are linked to a spatial region, for example to the national territory of all the EU member states, compliance with the applicable legal requirements is ensured. At the same time, it is ensured that outside the geographical area of application of the relevant legal requirements, the optimal axle load for starting can be applied to the drive axle. This means that the axle load that, on the one hand, permits safe starting, and, on the other hand, is as small as possible to avoid wear to the drive axle, is always selected.

The off-road starting sensing device utilized in accordance with embodiments of the present invention, preferably includes an off-road starting control element, for example, in the driver's cab of the semitrailer tractor. It, therefore, interacts with the axle load adjusting device such that the second-axle axle load can be changed by actuating the off-road starting control element according to at least one predefined control sequence.

The off-road starting control element can be, for example, a multifunction switch which can be placed in a plurality of positions, one of the positions indicating that the tractor-trailer combination is moving on a nonpublic piece of land, so that the axle load can be increased above a maximum legally permissible axle load.

The off-road starting control element can have a plurality of switched positions which correspond to a plurality of axle loads above the maximum axle load. Also, the off-road starting control element can be capable of being operated by a control sequence of just one switching element such that the axle load is increased. It is therefore possible, for example, to count the number of control actions which occur within a predefined time interval. The more often the control element is actuated, the higher the axle load.

Turning now to the drawings, FIG. 1 shows a tractor-trailer combination 10 that includes a semitrailer tractor 12 and a semitrailer 14. Semitrailer tractor 12 has a front axle 16 and a drive axle 18 that is driven by an engine (not shown). In the region above drive axle 18, there is a support 20 on which semitrailer 14 rests and to which semitrailer 14 is connected. Semitrailer tractor 12 has a driver's cab 22.

Semitrailer 14 has a first axle 24, a second axle 26 and a third axle 28. At least first axle 24 is vertically adjustable by means of, for example, pneumatic bellows and an axle center height drive 30 (indicated schematically). Third axle 28 can also be vertically adjustable using an assigned axle center height drive.

Axle center height drive 30 is connected to an axle center height controller 32 that actuates axle center height drive 30 such that first axle 24 is at a predefined center height H measured as a deflection of the axle center points from a zero position at which all the axles 24, 26, 28 are subject to equal loading.

Depending on the respective center height H of first axle 24, a center of gravity S of semitrailer 14 is closer to or further away from semitrailer tractor 12. If, for example, the axle height H of first axle 24 is increased, as is indicated by a first arrow 34.1, and, as a result, the axle center heights H of second axle 26 and third axle 28 are reduced, as is indicated by arrows 34.2 and 34.3, the center of gravity S is shifted to the center of gravity S', which is located closer to semitrailer tractor 12. As a result, a drive-axle axle load $F_{18}$ acting on drive axle 18 increases in turn.

Axle center height drive 30 and axle center height controller 32 are part of an axle load adjusting device 36 that also includes an axle load sensor 38 and an off-road starting control element 40—e.g., in the form of a multifunction switch in the driver's cab 22. Axle load adjusting device 36 also includes a data processing unit 42 that is connected to axle load sensor 38, axle center height controller 32 and off-road starting control element 40.

Data processing unit 42 is in contact with a speedometer 44—e.g., in the form of a tachometer—and a position sensing device 46—e.g., in the form of a GPS receiver. Data processing unit 42 can be connected to or a part of an engine controller 48.

Values for a nominal axle load $F_{nom}$, a maximum axle load $F_{max}$ and a limiting axle load $F_{limit}$ can be stored in a digital memory 50 of data processing unit 42. When tractor-trailer combination 10 is operating, data processing unit 42 senses continuously whether a situation is present in which drive axle 18 should be raised to facilitate starting of the tractor-trailer combination. This can be accomplished, for example, by continuously checking the position of off-road starting control element 40.

If the driver of tractor-trailer combination 10 sets the off-road starting control element to an off-road starting assistance position, data processing unit 42 actuates axle center height controller 32 such that it, in turn, actuates axle center height drives 30 such that the center of gravity S moves toward semitrailer tractor 12 and, as a result, increases axle load $F_{18}$. Axle load $F_{18}$ can then be above its nominal axle load. For this purpose, first axle 24 is raised to a greater center height H so that it supports less load and second axle 26 will receive a second-axle axle load $F_{26}$ and third axle 28 (which is, essentially, a second "second axle") will receive a third-axle axle load $F_{28}$ that is above its maximum axle load $F_{max}$. In this context, axle loads $F_{26}$ and $F_{28}$ are always below limiting axle load $F_{limit}$ which constitutes a configuration-related upper limit of the load bearing capacity of axles 26, 28.

If the off-road starting control element is moved back to its normal position, axle load $F_{18}$ is reduced in that the first axle is reduced to height zero and takes up the full load again.

Figure 2:
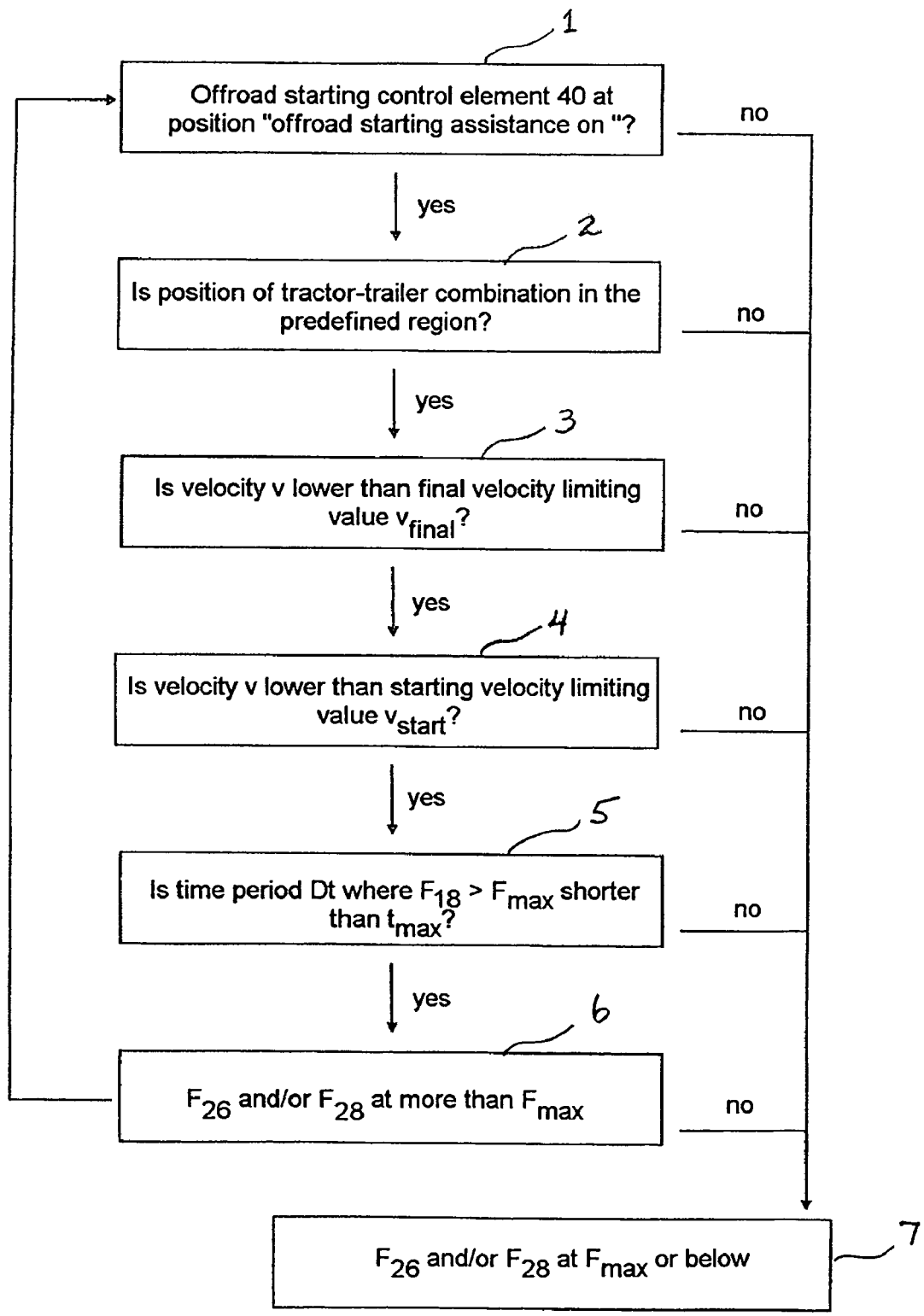
FIG. 2 is a flowchart embodying axle center height control process steps in accordance with an embodiment of the present invention.

FIG. 2 is a flowchart illustrating a program running in data processing unit 42 in accordance with an embodiment of the present invention. At first a check is performed to ascertain whether off-road starting control element 40 is switched to the position "off-road starting assistance on" (decision 1). If this is the case, a check is performed to ascertain whether the position P of tractor-trailer combination 10, which can be determined by position sensing device 46, is within a region G in which the axle load is permitted to be increased to a value above the maximum axle load $F_{max}$ (decision 2). To do this, data processing unit 42 accesses a digital map, for example.

Subsequently, a check is performed to ascertain whether a velocity v of tractor-trailer combination 10 is less than a final velocity limiting value $v_{final}$ (decision 3) and a starting velocity limiting value $v_{start}$ (decision 4). If velocity v is less than $v_{final}$ and $v_{start}$, second-axle axle load $F_{26}$ or second-axle axle load $F_{26}$ and third-axle axle load $F_{28}$ is/are increased to a value above maximum axle load $F_{max}$; this represents a first time $t_1$ and the time period Δt, which is continuously compared with a maximum time $t_{max}$, begins (step 5).

When one of the foregoing conditions fails to be met, data processing unit 42 actuates axle center height controller 32 such that it, in turn, changes axle center height H such that the center of gravity S moves away from semitrailer tractor 12 and, therefore, reduces the axle load or loads $F_{26}$ and/or $F_{28}$ to a value which corresponds at most to maximum axle load $F_{max}$ (step 7).

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a tractor-trailer combination including (i) a semitrailer tractor having (a) a front axle and (b) at least one drive axle having a predefined nominal axle load, (ii) a semitrailer having (c) a first axle and (d) at least one second axle, and (iii) an axle load adjusting device, including an axle center height drive for said first axle adapted to change a drive-axle axle load acting on said drive axle by adjustment of a center height of said first axle, said axle load adjusting device being adapted to automatically switch into a starting assistance mode in which a second-axle axle load acting on said at least one second axle is increased to a starting-assistance axle load that is less than a predefined maximum axle load, an axle center height controller adapted to automatically sense actuation of an off-road starting sensing device, and to increase said second-axle axle load to an off-road starting axle load that is greater than said predefined maximum axle load when said off-road starting sensing device is actuated.

2. The axle center height controller according to claim 1, wherein said axle center height controller is adapted to at least one of (i) reduce said second-axle axle load to and (ii) maintain said second-axle axle load at a value that is less than said predefined maximum axle load when said off-road starting sensing device is de-actuated.

3. The axle center height controller according to claim 1, wherein said axle center height controller is adapted to sense said second-axle axle load using an axle load sensor, and wherein said axle load adjusting device is adapted to change said drive-axle axle load based on said second-axle axle load.

4. The axle center height controller according to claim 1, wherein said predefined maximum axle load is 130% of said predefined nominal axle load.

5. The axle center height controller according to claim 1, wherein said off-road starting axle load is always less than 200% of said predefined nominal axle load.

6. The axle center height controller according to claim 1, further comprising a time measuring device, and wherein said axle center height controller is adapted to (i) measure an elapsed time period from the point in time at which said axle load exceeds said predefined maximum axle load, (ii) compare said elapsed time period with a predefined maximum time, and (iii) reduce said second-axle axle load to at most said predefined maximum axle load when said maximum time is exceeded.

7. The axle center height controller according to claim 1, wherein said axle center height controller is adapted to automatically sense a velocity of said tractor-trailer combination using a speedometer, and to automatically compare said velocity against a predefined final velocity threshold value and reduce said second-axle axle load to at most said predefined maximum axle load when said final velocity threshold value is exceeded.

8. The axle center height controller according to claim 1, wherein said axle load adjusting device is adapted to automatically sense a velocity of said tractor-trailer combination, and to compare said velocity against a predefined starting velocity threshold value and increase said second-axle axle load to said off-road starting axle load above said predefined maximum axle load only when said starting velocity threshold value is undershot.

9. The axle center height controller according to claim 1, wherein said axle center height controller is in communication with a position sensing device to determine the location of said tractor-trailer combination, and wherein said axle center height controller is adapted to determine whether said tractor-trailer combination is located in a predefined region, and to increase said second-axle axle load to said off-road starting axle load above said predefined maximum axle load only when said tractor-trailer combination is located in said predefined region.

10. The axle center height controller according to claim 9, wherein said position sensing device is a satellite navigation device.

11. The axle center height controller as claimed in claim 9, wherein said predefined region is a nonpublic traffic area.

12. The axle center height controller according to claim 1, further comprising a digital memory for storing said predefined nominal axle load and said predefined maximum axle load, and wherein each of said predefined nominal axle load and said predefined maximum axle load is associated with an applicable spatial region.

13. A tractor-trailer combination, comprising:
(a) a semitrailer tractor including a front axle and at least one drive axle having a predefined nominal axle load;
(b) a semitrailer including a first axle and at least one second axle; and
(c) an axle load adjusting device adapted to assume a starting assistance mode in which a second-axle axle load acting on said at least one second axle is increased to a starting-assistance axle load that is less than a predefined maximum axle load, said axle load adjusting device including (i) an axle center height drive for said first axle adapted to change a drive-axle axle load acting on said drive axle by adjustment of a center height of said first axle, and (ii) an axle center height controller adapted to automatically sense actuation of an off-road starting sensing device, and to increase said second-axle axle load to an off-road starting axle load that is greater than said predefined maximum axle load when said off-road starting sensing device is actuated.

14. The tractor-trailer combination as claimed in claim 13, wherein said semitrailer includes an axle load sensor for measuring said second-axle axle load.

15. The tractor-trailer combination according to claim 13, wherein said off-road starting sensing device includes an off-road starting control element in a driver's cab of said semitrailer tractor, and wherein said off-road starting sensing device interacts with said axle load adjusting device to change said second-axle axle load by actuating said off-road starting control element according to at least one predefined actuation sequence.

16. A method for operating a tractor-trailer combination according to claim 13, comprising the steps of:
(i) sensing actuation of said off-road starting sensing device,
(ii) sensing said predefined maximum axle load for said second-axle axle load, and
(iii) increasing said second-axle axle load acting on said off-road starting axle load that is greater than said predefined maximum axle load when said off-road starting sensing device is actuated.

17. The method according to claim 16, further comprising the steps of sensing a location of said tractor-trailer combination, determining whether said location is within a predefined region, and increasing said second-axle axle load to said off-road starting axle load that is greater than said maximum axle load only when said location is within said predefined region.

* * * * *